(12) United States Patent
Kok et al.

(10) Patent No.: US 10,316,147 B2
(45) Date of Patent: Jun. 11, 2019

(54) MODIFIED SILICON OIL FOR LOW TEMPERATURE CURE DIE CASTING LUBRICANTS

(71) Applicant: Henkel AG & Co. KGaA, Duesseldorf (DE)

(72) Inventors: Douwe Marten Kok, Scheemda (NL); Martijn Quico Slagt, Broonegerveen (NL); Johannes Hendrikus Gerhardus Franciscus Braam, Stadskanaal (NL); Gerrit Jan Odink, Winschoten (NL)

(73) Assignee: Henkel AG & Co. KGaA, Duesseldorf (DE)

( * ) Notice: Subject to any disclaimer, the term of this patent is extended or adjusted under 35 U.S.C. 154(b) by 18 days.

(21) Appl. No.: 15/297,431

(22) Filed: Oct. 19, 2016

(65) Prior Publication Data
US 2017/0037192 A1 Feb. 9, 2017

Related U.S. Application Data

(63) Continuation of application No. PCT/EP2015/058649, filed on Apr. 22, 2015.

(30) Foreign Application Priority Data

Apr. 24, 2014 (GB) .................................. 1407247.4

(51) Int. Cl.
| | | |
|---|---|---|
| *C08G 77/20* | (2006.01) | |
| *C10M 107/30* | (2006.01) | |
| *C08G 77/38* | (2006.01) | |
| *C08L 83/04* | (2006.01) | |
| *B22D 17/20* | (2006.01) | |
| *C10M 173/02* | (2006.01) | |
| *C10M 173/00* | (2006.01) | |
| *C08G 77/12* | (2006.01) | |

(52) U.S. Cl.
CPC ......... *C08G 77/20* (2013.01); *B22D 17/2007* (2013.01); *C08G 77/38* (2013.01); *C08L 83/04* (2013.01); *C10M 107/30* (2013.01); *C10M 173/00* (2013.01); *C10M 173/02* (2013.01); *C08G 77/12* (2013.01); *C08L 2205/025* (2013.01); *C10M 2229/044* (2013.01); *C10M 2229/0415* (2013.01); *C10M 2229/0445* (2013.01); *C10N 2220/022* (2013.01); *C10N 2230/08* (2013.01); *C10N 2240/58* (2013.01); *C10N 2270/00* (2013.01)

(58) Field of Classification Search
CPC ......... C08G 77/12; C08G 77/20; C08G 77/08
USPC ........................................................ 528/31
See application file for complete search history.

(56) References Cited

U.S. PATENT DOCUMENTS

| | | | |
|---|---|---|---|
| 4,609,574 A | 9/1986 | Keryk | |
| 5,527,936 A * | 6/1996 | Dindi ........................ | C07F 7/14 556/470 |
| 5,565,194 A | 10/1996 | Burkhart et al. | |
| 6,121,347 A * | 9/2000 | Yatsuyanagi ............ | C08K 9/06 252/182.14 |
| 6,395,704 B1 * | 5/2002 | Branlard ................ | A61K 8/585 424/401 |
| 2010/0178266 A1* | 7/2010 | Huggins .................. | A61K 8/55 424/70.12 |
| 2012/0215019 A1* | 8/2012 | Arkles .................. | C07F 7/0849 556/456 |

FOREIGN PATENT DOCUMENTS

| | | |
|---|---|---|
| JP | 200521330 A | 8/2005 |
| JP | 2006307009 A | 11/2006 |

OTHER PUBLICATIONS

International Search Report for PCT/EP2015/058649, dated Jul. 2, 2015.

\* cited by examiner

*Primary Examiner* — Margaret G Moore
(74) *Attorney, Agent, or Firm* — Mary K. Cameron

(57) ABSTRACT

The present invention relates to a mixture of polyalkylsiloxanes that cure at temperatures of about 170° C. while being unreactive under ambient conditions during storage or transport and which are obtained through a hydrosilylation reaction wherein a mixture of ethylenically unsaturated olefins consisting of 1-100% of one or more polyene(s), and 0-99 mol % of monounsaturated olefins with 6 to 15 carbon atoms is reacted with an amount of one or more polyalkylhydrosiloxanes in the presence of a hydrosilylation catalyst. Furthermore, the present invention relates to water-based compositions suitable for use in metal casting processes as a mold release agent comprising a mixture of polyalkylsiloxanes of the invention and a non-ionic surfactant. In addition, the present invention relates to the use of the polyalkylsiloxanes and mixtures of polyalkylsiloxanes as defined herein.

20 Claims, No Drawings

MODIFIED SILICON OIL FOR LOW TEMPERATURE CURE DIE CASTING LUBRICANTS

This invention relates to new silicones, processes for the production thereof and their uses, e.g., as die casting lubricants.

State of the art silicon oils used in pressure die casting release agents are well known for their high temperature stability and excellent release properties. These silicon oils form a solid film on the die at temperatures above 225° C. Formation of such a solid film on the die by curing at these temperatures allows the lubricant to practice its release function on the complete surface of the die. However, in various cases the die temperature does not exceed the curing temperature of the silicon oil, thus preventing the formation of a solid silicone film on the colder parts of the die with a concomitant decrease in release properties of the pressure die casting release agent.

It is an object of the present invention to provide an alternative pressure die casting release agent which has the same high temperature stability, lubricating properties and casting release rates as state of the art die casting release agents with the additional benefit of solid film formation at lower temperatures at or above 170° C. while being unreactive under ambient conditions during storage or transport. This is advantageous since a mold can have colder spots resulting from its design and the type of casting, the efficiency of internal cooling, the thickness of the casting on specific spots (thin parts of the casting give of less energy to the die), and the efficiency of external cooling by spraying of lubricant on specific spots. The temperature of a mold can intentionally be kept cooler to influence casting quality, to cast with lower melting metals/alloys, and to lower temperature on hot-spots by reducing temperature of complete die.

In a first aspect, the present invention thus relates to a mixture of polyalkylsiloxanes obtainable through a hydrosilylation reaction wherein a mixture of ethylenically unsaturated olefins consisting of
 a) 1-100 mol %, preferably 10-30 mol % of one or more polyene(s) having one terminal double bond which is either monosubstituted or geminal disubstituted and one or more tri- or tetrasubstituted double bond(s), wherein said terminal double bond and said one or more tri- or tetrasubstituted double bond(s) are preferably non-conjugated, wherein said polyene(s) are preferably terpenes, more preferably (R)-limonene, (S)-limonene or a mixture thereof, and
 b) 0-99 mol %, preferably 70-90 mol % of monounsaturated olefins with 6 to 15 carbon atoms, preferably 1-dodecene,
is reacted with an amount of one or more polyalkylhydrosiloxanes in the presence of a hydrosilylation catalyst while each polyalkylhydrosiloxane comprises a repeating unit according to the general structure (I):

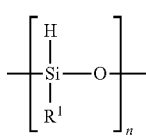

(I)

with n indicating the number of repeating units being in a range of from 5 to 10,000, preferably 10 to 100, more preferably 25;
with the residue $R^1$ being selected from linear or branched alkyl groups with less than 6 carbon atoms.

In another aspect, the present invention relates to a polyalkylsiloxane comprising repeating units according to general structure (II):

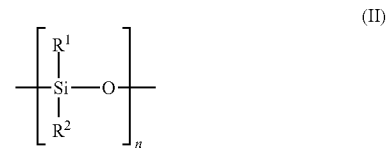

(II)

wherein n indicates the number of repeating units comprised in the polyalkylsiloxane, wherein n is an integer of 5 to 10,000 and residue $R^1$ is selected from the group consisting of linear or branched alkyl groups with less than 6 carbon atoms,
wherein
 a) in 1-100% of the repeating units $R^2$ is selected from the group consisting of linear or branched or cyclic alkenyl groups, obtained by the addition of a Si—H bond across the terminal double bond of a polyene having one terminal double bond which is either monosubstituted or geminal disubstituted and one or more tri- or tetrasubstituted double bond(s), wherein said terminal double bond and said one or more tri- or tetrasubstituted double bond(s) are preferably non-conjugated, wherein said polyene is preferably a terpene, more preferably (R)-limonene, (S)-limonene or a mixture thereof, in a hydrosilylation reaction,
 b) in 0-99% of the repeating units $R^2$ is selected from the group consisting of linear or branched alkyl groups with 6 to 15 carbon atoms, and
 c) in 0-10% of the repeating units, preferably less than 10%, $R^2$ is H.

In a further aspect, the present invention relates to a water-based composition suitable for use in metal casting processes as a mold release agent comprising
 a) 1-50 wt.-% of a mixture of polyalkylsiloxanes or polyalkylsiloxane as defined above,
 b) 1-15 wt.-% of a non-ionic surfactant having a HLB value of at least 8, and
 c) 0-30 wt.-% of waxes, mineral oils and/or natural/synthetic oils.

In another aspect, the present invention relates to the use of polyalkylsiloxanes as a mold release agent in a metal casting process, wherein i) the polyalkylsiloxanes are a mixture of polyalkylsiloxanes as defined herein, ii) the polyalkylsiloxanes are polyalkylsiloxanes as defined herein, or iii) the polyalkylsiloxanes comprise a repeating unit according to the following general structure (II):

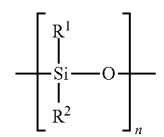

(II)

wherein n indicates the number of repeating units being in a range of from 5 to 10,000; wherein for each repeating unit the residue $R^1$ is independently selected from linear alkyl groups with less than 6 carbon atoms; and wherein for each repeating unit the residue $R^2$ is independently selected from (a) hydrogen or (b) linear or branched alkyl groups having 6 to 15 carbon atoms or (c) a linear or branched or cyclic alkenyl group, obtained by the addition of a Si—H bond across the terminal double bond of a polyene having one terminal double bond which is either monosubstituted or geminal disubstituted and one or more tri- or tetrasubstituted double bond(s), wherein said terminal double bond and said one or more tri- or tetrasubstituted double bond(s) are preferably non-conjugated, wherein said polyene is preferably a terpene, more preferably (R)-limonene, (S)-limonene or a mixture thereof, in a hydrosilylation reaction, while the fraction of repeating units with a residue $R^2$ being hydrogen is less than 0.1, being an alkenyl residue, preferably a terpene residue, more preferably a (R)-limonene residue, (S)-limonene residue or a mixture thereof, is in a range of from 0.01-1.0, and being a linear or branched alkyl group having 6 to 15 carbon atoms is in a range of from 0-0.99.

Further embodiments are defined in the appended claims.

The inventors of the present invention surprisingly found that silicon oil prepared by functionalization of polymethylhydrosiloxane with a mixture of mono unsaturated olefins with 6 to 15 carbon atoms, especially 1-dodecene, and one or more polyene(s) having one terminal double bond which is either monosubstituted or geminal disubstituted and one or more tri- or tetrasubstituted double bond(s), wherein said terminal double bond and said one or more tri- or tetrasubstituted double bond(s) are preferably non-conjugated, wherein said polyene(s) are preferably terpenes, more preferably (R)-limonene, (S)-limonene or a mixture thereof, results in silicon oil, which cures (forms a film) at low (>170° C.) temperatures. This makes the oil especially suitable for application on cooler casting dies or in magnesium casting.

Furthermore, the one or more polyenes attached to the polymer backbone allow for cross-linking of the polysiloxane chains by an oxidative non-metal catalyzed process. The curing sets in at a temperature above 170° C. while regular silicon oil start curing at temperatures above 225° C., making this new silicone oil ideal for film formation on cooler casting dies and/or cooler parts of the casting die. The curing is preferably completed at below 190° C. (for a 10 μm layer).

The silicon oil is stable at room temperature and the high temperature stability is comparable or better compared to state of the art silicon oils. It was found that the one terminal double bond (either monosubstituted or geminal disubstituted) of the polyenes of the invention is active and selective in the hydrosilylation reaction while the one (or more) tri- or tetrasubstituted double bond(s) are active in oxidative cross coupling reactions (required for low temperature cure), but do not cross link via hydrosilylation (unwanted cross linking during silicone oil synthesis). In contrast to the polyenes used according to the invention, alfa-omega dienes, such as 1,7-octadiene, were found to result in undesirable cross-linking by hydrosilylation during the silicon oil synthesis. Further, lower activity in desirable oxidative cross-linking (higher T required) was observed when disubstituted alkenes (instead of tri or tetra) were employed (e.g. coupling of polybutadiene). Preferred polyenes are those that are derived from renewable sources, for example terpenes, in particular limonene, which is preferred due to its low costs and production from renewable sources.

The new and improved polyalkylsiloxane derivatives may be in the form of silicone oil. This compound may be directly used as a lubricant or included in a release agent for pressure die casting.

The new polyalkylsiloxane derivatives are particularly advantageous in water-based compositions.

However, a second field of application is use of the new modified silicon oil in casting processes where the silicon oil is applied directly (not as emulsion) on the mold.

Accordingly, the present invention relates to a modified polysiloxane which is prepared by hydrosilylation of polymethylhydrosiloxane with a mixture of one or more polyene(s) as defined above and monounsaturated olefins with 6 to 15 carbon atoms according to state of the art methodology. The ratio of the monounsaturated olefins to the one or more polyene(s) is chosen such to provide a liquid modified polysiloxane with a kinematic viscosity of 100-20000 mPa·s at 25° C.

In certain embodiments, the modified polysiloxanes can be directly applied to the mold, i.e. can directly be used as die casting release agents.

In further embodiments, the modified polysiloxanes are applied to the mold as a mixture with mineral oils, natural/synthetic oils and/or (petroleum) distillates. In such embodiments, the modified polysiloxanes are comprised in a die casting release agent that further includes the listed components, i.e. mineral oils, natural/synthetic oils and/or (petroleum) distillates.

In various embodiments, the modified polysiloxanes are included in an aqueous composition, such as an aqueous emulsion.

More specifically, the die casting release agent may be an aqueous emulsion comprising the modified polysiloxane (5-50 wt.-%), a surfactant mixture (1-15 wt.-%), optionally waxes mineral oils and/or natural/synthetic oils (0-30 wt.-%) and water adding up to 100 wt.-%.

Typically, the modified polysiloxane is prepared as follows. The modified silicone oil is prepared by addition of the catalytic effective amount of hydrosilylation catalyst such as platinum catalyst to a mixture of polymethylhydrosiloxane and a monounsaturated olefin with 6 to 15 carbon atoms. Subsequently, further monounsaturated olefin was given to the reaction mixture to keep the temperature in a range from 80 to 170° C. followed by adding the polyene dropwise to the mixture giving a Si—H conversion of >95%.

The modified polysiloxane may be a polymethylsiloxane functionalized with a mixture of one or more polyene(s) as defined above, preferably ethylenically unsaturated terpene residues, more preferably (R)-limonene, (S)-limonene or a mixture thereof, (1-100 mol %) and alkyl residues with 6 to 15 atoms (0-99 mol %). The modified polysiloxane preferably has a kinematic viscosity below 20000 mPa·s, preferably below 7000 mPa·s at 25° C. to allow successful emulsification.

Accordingly, the present invention relates to a mixture of polyalkylsiloxanes obtainable through a hydrosilylation reaction wherein a mixture of ethylenically unsaturated olefins consisting of a) 1-100 mol %, preferably 10-30 mol % of one or more polyene(s) having one terminal double bond which is either monosubstituted or geminal disubstituted and one or more tri- or tetrasubstituted double bond(s), wherein said terminal double bond and said one or more tri- or tetrasubstituted double bond(s) are preferably non-conjugated, wherein said polyene(s) are preferably terpenes, more preferably (R)-limonene, (S)-limonene or a mixture thereof, and b) 0-99 mol %, preferably 70-90 mol % of monounsaturated olefins with 6 to 15 carbon atoms, preferably 1-dodecene, is reacted with an amount of one or more polyalkylhydrosiloxanes in the presence of a hydrosilylation catalyst while each polyalkylhydrosiloxane comprises a repeating unit according to the general structure (I):

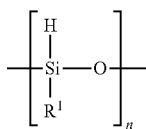

with n indicating the number of repeating units being in a range of from 5 to 10,000, preferably 10 to 100, more preferably 25;
with the residue $R^1$ being selected from linear or branched alkyl groups with less than 6 carbon atoms.

The term "ethylenically unsaturated olefin", as used herein, refers to mono-, di- or polyunsaturated olefins, i.e. hydrocarbons having a single, two or more ethylenic double bond such as linear and branched chain and cyclic aliphatic olefins.

The term "polyene", as used herein, relates to hydrocarbons having two or more double bonds, including linear and branched and cyclic aliphatic alkenes.

The term "terpene", as used herein, refers to compounds that are derived from two or more isoprene (2-Methyl-1,3-butadien) units. The term thus covers hydrocarbon residues having 5, 10, 15, 20, 25, 30, 35, 40 etc. carbon atoms. The term includes branched chain and cyclic compounds. Terpenes that can be advantageously used according to the invention include acyclic and monocyclic terpenes, preferably monocyclic terpenes. Particularly preferred are monoterpenes, specifically monocyclic monoterpenes, such as limonene.

"Non-conjugated", as used herein, means that the terminal double bond on the one hand and the one or more tri- or tetrasubstituted double bonds on the other hand are not separated by one single bond.

The term "mol %" relates to the molar ratio of the given component with regard to the total amount of olefins in the reaction.

The term "polyalkylhydrosiloxane" refers to a polymer comprising repeating units according to a general structure (I). In certain embodiments, the polymer further comprises trimethyl groups as terminators.

The term "hydrosilylation", also called catalytic hydrosilation, describes the addition of Si—H bonds across unsaturated bonds. Typically, the reaction is conducted catalytically and usually the substrates are unsaturated organic compounds. Monounsaturated alkenes give alkyl silanes. A platinum catalyst is usually employed.

Olefins with 6 to 15 carbon atoms are preferably selected from the group of olefins with 6 to 14 carbon atoms. Most preferably, the olefin with 6 to 15 carbon atoms selected for use in the present invention is 1-dodecene.

In certain embodiments, n is an integer of from 5 to 10,000, 5 to 7,000, or 5 to 5,000. Preferably, n is an integer of from 5 to 2,500, 5 to 1,000, or 5 to 500. More preferably, n is an integer of from 5 to 250, 5 to 200, 5 to 100. Even more preferably, n is an integer of from 5 to 50, 5 to 40, 5 to 30, 5 to 29, 5 to 28, 5 to 27, 5 to 26, or 5 to 25.

In some embodiments, $R^1$ is selected from the group consisting of methyl, ethyl, linear or branched C3-C5 alkyl. In some embodiments, $R^1$ is selected from the group consisting of methyl, ethyl, n-propyl, 1-methyl-ethyl, n-butyl, tert-butyl, 1-methyl propyl, 2-methyl propyl, n-pentyl, 2-pentyl, 3-pentyl, 2-methyl butyl, 3-methyl butyl, 3-methyl but-2-yl, 2-methyl but-2-yl, and 2,2,-dimethyl propyl. In certain embodiments, $R^1$ is selected from the group consisting of H, ethyl, n-propyl, 1-methyl ethyl. In certain embodiments, $R^1$ is H.

Typically, the resulting mixture of polyalkylsiloxanes is an oil.

In certain embodiments, the mixture of polyalkylsiloxanes is obtained in a hydrosilylation reaction being conducted with an amount of polyalkylhydrosiloxanes that equals at least 60%, preferably at least 80% of the stoichiometric amount, but preferably equals not more than the stoichiometric amount. In certain embodiments, the reaction is performed with an amount of polyalkylhydrosiloxanes that equals at least 60%, 70%, 80%, 90%, 95%, 97.5%, 99%, or 99.5% of the stoichiometric amount.

In some embodiments, the mixture of polyalkylsiloxanes is obtained in a hydrosilylation reaction being conducted with polyalkylhydrosiloxanes that are at least partially selected from polymethylhydrosiloxanes, and preferably with polyalkylhydrosiloxanes wherein at least 80 mol % of the repeating units according to the general structure (I) have a residue $R^1$ being a methyl group.

However, in some embodiments in the method of the present invention polyalkylhydrosiloxanes are employed, wherein at least 80, 85, 95, 97.5, 98, 99, or 99.5 mol % of the repeating units according to the general structure (I) have a residue $R^1$ being a methyl group.

In further embodiments, the mixture of polyalkylsiloxanes is obtained in a hydrosilylation reaction wherein at least 80 mol % of the monounsaturated olefins are selected from α-olefins.

Preferably, the mixture of polyalkylsiloxanes is obtained in a hydrosilylation reaction wherein at least 80 mol %, 90 mol %, 95 mol %, 97.5 mol %, 99 mol %, or 99.5 mol % of the monounsaturated olefins are selected from α-olefins.

In various embodiments, the mixture of polyalkylsiloxanes is obtained in a hydrosilylation reaction wherein the hydrosilylation catalyst is a platinum catalyst. The platinum catalyst may be selected from the group consisting of chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum black, platinum acetylacetonate, platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, $RhCl_3(Bu_2S)_3$, speier's catalyst, and karstedt's catalyst. Preferably, the platinum catalyst is speier's or karstedt's catalyst, more preferably speier's catalyst.

In some embodiments, the mixture of polyalkylsiloxanes is obtained in a hydrosilylation reaction wherein the reaction mixture is kept at temperature in the range of from 80 to 180° C., preferably for a time sufficient to yield a mixture of polyalkylsiloxanes that contains not more than 10 mol % Si—H bonds. Preferably, the reaction is carried out for a time sufficient to yield a mixture of polyalkylsiloxanes containing not more than 10, 9, 8, 7, 6, 5, 4, 3, 2, or 1 mol % Si—H bonds. Preferably, the reaction is carried out for a time sufficient to yield a mixture of polyalkylsiloxanes containing not more than 6 mol % Si—H bonds.

In certain embodiments, the mixture of polyalkylsiloxanes is obtained in a hydrosilylation reaction wherein the weight fraction of an inert liquid vehicle that acts as a solvent for the amount of the one or more polyalkylhydrosiloxanes or the ethylenically unsaturated olefins may be less than 20 wt.-%, preferably less than 10 wt.-%, more preferably less than 1 wt.-%. Suitable inert liquid vehicles may be selected from, but not limited to, aprotic solvents, such as toluene or tetrahydrofurane. The reaction is preferably carried without any such inert liquid vehicle. Any residual solvent is preferably removed after completion of the reaction. The catalyst may be removed from the reaction mixture by methods known in the art.

In another aspect, the present invention relates to a polyalkylsiloxane comprising repeating units according to general structure (II):

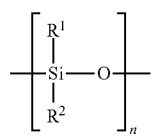

(II)

wherein n indicates the number of repeating units comprised in the polyalkylsiloxane, wherein n is an integer of 5 to 10,000 and residue $R^1$ is selected from the group consisting of linear or branched alkyl groups with less than 6 carbon atoms, wherein a) in 1-100%, preferably in 10 to 30%, of the repeating units $R^2$ is selected from the group consisting of linear or branched or cyclic alkenyl groups, obtained by the addition of a Si—H bond across the terminal double bond of a polyene having one terminal double bond which is either monosubstituted or geminal disubstituted and one or more tri- or tetrasubstituted double bond(s), wherein said terminal double bond and said one or more tri- or tetrasubstituted double bond(s) are preferably non-conjugated, wherein said polyene is preferably a terpene, more preferably (R)-limonene, (S)-limonene or a mixture thereof, in a hydrosilylation reaction, b) in 0-99%, preferably in 70-90%, of the repeating units $R^2$ is selected from the group consisting of linear or branched alkyl groups with 6 to 15 carbon atoms, and c) in 0-10% of the repeating units, preferably less than 10%, $R^2$ is H.

In these embodiments, the percentages of the repeating units as defined in a)-c) add up to 100%. The percentages given relate to the total number of repeating units in the polyalkylsiloxane.

$R^1$ of Structure (II) is defined identical to $R^1$ in Structure (I).

In certain embodiments, the polyalkylsiloxane has a kinematic viscosity of 100 to 20000 mPa·s at 25° C., preferably of 100 to 7000 mPa·s at 25° C. The term "kinematic viscosity" refers to a viscosity which is determined by determining the dynamic viscosity μ, and dividing the dynamic viscosity μ by the density of the fluid ρ. Methods for determining the kinematic viscosity are well known in the art.

In further embodiments, the polyalkylsiloxane is defined as above, wherein for fraction b) $R^2$ is selected from the group consisting of linear or branched alkyl groups with 6 to 14 carbon atoms. In certain embodiments, $R_2$ of fraction b) is selected from the group consisting of hexyl, heptyl, octyl, nonyl, decyl, undecyl, and dodecyl. Preferably, $R_2$ of fraction b) is dodecyl.

In some embodiments, repeating units according to fraction a), make up 10-30%, preferably at least about 10% of the total repeating units in the polyalkylsiloxane.

In certain embodiments, repeating units with $R^2$ falling within the scope of fraction b) make up 70-90% of the total repeating units in the polyalkylsiloxane.

In some embodiments, the ratio of fraction a) to fraction b) is in the range of from 10:1 to 1:10, preferably 1:2.3 to 1:9.

According to some embodiments, substituent $R^1$ of each repeating unit according to general structure (II) is a methyl group. In further embodiments, in at least 80% of the repeating units according to general structure (II) $R^1$ is a methyl group. In certain embodiments, in at least 80, 90, 95, 97.5, 99, or 99.5% of the repeating units according to general structure (II) $R^1$ is a methyl group.

Preferably, the polyalkylsiloxane of the present invention is an oil. In that case, the polyalkylsiloxane can be used as die casting lubricant without further additives.

In other embodiments, it can be used as a die casting component and can additionally comprise mineral oils, natural/synthetic oils and/or (petroleum) distillates.

In still further embodiments, the modified polysiloxane may be included in a water-based emulsion in combination with a suitable surfactant, optionally waxes, mineral oils and/or natural/synthetic oils, and water.

In certain embodiments, the water-based emulsion comprises a surfactant mixture. The surfactant mixture comprises emulsifying agents which are able to form stable emulsions with the modified polysiloxanes. In certain embodiments, the surfactant mixture may be a mixture of ethoxylated oxo-alcohols.

The term "ethoxylation" refers to the addition of ethylene oxide to alcohols to give a surfactant.

The term "oxo alcohols" means alcohols that are prepared by adding carbon monoxide (CO) and hydrogen to an olefin to obtain an aldehyde using the hydroformylation reaction and then hydrogenating the aldehyde to obtain the alcohol.

The term "ethoxylated oxo-alcohols" relates to oxo-alcohols which have undergone ethoxylation.

For example, a surfactant for use in the water-based emulsion may be a mixture of polysorbate 85 and ethoxylated (6-8) tridecyl alcohol.

In some embodiments, the ethoxylated oxo-alcohols are used in the water-based emulsion at weight ratios of 1:4 to 1:10 with respect to the modified polysiloxane. Additionally, other surfactants, either anionic, nonionic and/or cationic may be used in the water-based emulsion.

Accordingly, the present invention also relates to a water-based composition suitable for use in metal casting processes as a mold release agent comprising a) 1-50 wt.-% of a mixture of polyalkylsiloxanes or polyalkylsiloxane as defined herein, b) 1-15 wt.-% of a non-ionic surfactant having a HLB value of at least 8, and c) 0-30 wt.-% of waxes, mineral oils and/or natural/synthetic oils.

In certain embodiments, the content of modified polysiloxane in the aqueous emulsion is 1-50 wt.-%, preferably 5-50 wt.-%, more preferably 5-30 wt.-%.

Furthermore, the content of surfactant in the aqueous emulsion may be 1-15%, preferably 5-15 wt.-%, more preferably 5-10 wt.-%.

The term "wax" or "waxes", as used herein, relates to a class of organic chemical compounds that are insoluble in water and are plastic (malleable) at 20° C. and melt above 45° C. to give a low viscosity liquid. Waxes are insoluble in water but soluble in organic, nonpolar solvents. All waxes are organic compounds, both synthetic and naturally occurring.

The term "mineral oil", as used herein, relates to any of various colorless, odorless, light mixtures of alkanes in the C15 to C40 range from a non-vegetable (mineral) source, particularly a distillate of petroleum.

The term "natural/synthetic oil", as used herein, relates to a class of organic chemical compounds that are insoluble in water and are liquid at 20° C. The oils are insoluble in water but soluble in organic, nonpolar solvents. All encompassed oils are organic compounds, both synthetic and naturally occurring.

The term "plastic", as used in connection with wax, relates to its deformation when undergoing non-reversible changes of shape in response to applied forces. The term "malleable" refers to the ability of wax to deform under compressive stress. Examples of waxes being used in prior art mold-release compositions are polyethylenes and polypropylenes that may be modified. The term "modified" in connection with polyethylenes and polypropylenes means esterified or saponified polyethylenes and polypropylenes.

Also, other components may be incorporated in the die casting release agent, e.g., corrosion inhibitors, antimicrobials, and emulsions of various natural or synthetic oils.

Preferably, the water-based composition according to the present invention is an oil-in-water emulsion.

Also encompassed by the present invention is the preparation of the die casting release agent of the present invention.

The release agent may be prepared by combining the modified polysiloxane, the emulsifier, and water using an appropriate emulsifying apparatus to produce a stable oil in water emulsion followed by addition of water and optional other constituents.

Generally, application of the die casting release agent is preferably done by spray coating. Typically, the die casting release agent is employed in a dilution. In certain embodiments, the die casting release agent is employed in a 1-200 fold dilution, preferably 1-100 dilution, 1-50 dilution, or 1-20 dilution.

In some embodiments, the water-based composition comprises non-ionic surfactants being a mixture of polysorbate 85 and ethoxylated (6-8) tridecyl alcohol.

In various embodiments, the water-based composition is an oil-in-water emulsion.

In certain embodiments, the waxes are polyethylenes and/or polypropylenes which are either modified or not and are insoluble in water and are plastic (malleable) at 20° C. and melt above 45° C.

In a further aspect, the present invention relates to the use of polyalkylsiloxanes as a mold release agent in a metal casting process, wherein i) the polyalkylsiloxanes are a mixture of polyalkylsiloxanes as defined herein, ii) the polyalkylsiloxanes are polyalkylsiloxanes as defined herein, or iii) the polyalkylsiloxanes comprise a repeating unit according to the following general structure (II):

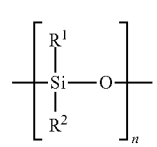

(II)

wherein n indicates the number of repeating units being in a range of from 5 to 10,000; wherein for each repeating unit the residue $R^1$ is independently selected from linear alkyl groups with less than 6 carbon atoms; and wherein for each repeating unit the residue $R^2$ is independently selected from (a) hydrogen or (b) linear or branched alkyl groups having 6 to 15 carbon atoms or (c) a linear or branched or cyclic alkenyl group, obtained by the addition of a Si—H bond across the terminal double bond of a polyene having one terminal double bond which is either monosubstituted or geminal disubstituted and one or more tri- or tetrasubstituted double bond(s), wherein said terminal double bond and said one or more tri- or tetrasubstituted double bond(s) are preferably non-conjugated, wherein said polyene is preferably a terpene, more preferably (R)-limonene, (S)-limonene or a mixture thereof, in a hydrosilylation reaction, while the fraction of repeating units with a residue $R^2$ being hydrogen is less than 0.1, being an alkenyl residue, preferably a terpene residue, more preferably a (R)-limonene residue, (S)-limonene residue or a mixture thereof, is in a range of from 0.01-1.0, preferably 0.1 to 0.3, and being a linear or branched alkyl group having 6 to 15 carbon atoms is in a range of from 0-0.99, preferably 0.7 to 0.9.

$R^1$ is defined as above. $R^2$ may be defined as for the polyalkylsiloxanes of the invention described above.

In some embodiments, the $R^2$ being alkyl may be selected from the group consisting of linear or branched alkyl groups with 6 to 14 carbon atoms. In certain embodiments, $R_2$ is selected from the group consisting of hexyl, heptyl, octyl, nonyl, decyl, undecyl, and dodecyl. Preferably, $R_2$ is dodecyl.

According to some embodiments, residue $R^1$ of each repeating unit according to general structure (II) is a methyl group. In further embodiments, residue $R^1$ of at least 80% of the repeating units according to general structure (II) is a methyl group. In certain embodiments, residue $R^1$ of at least 80, 90, 95, 97.5, 99, or 99.5% of the repeating units according to general structure (II) is a methyl group.

In various embodiments, the use of polyalkylsiloxanes as a mold release agent in a metal casting process concerns polyalkylsiloxanes as defined above, wherein the ratio of repeating units according to the general structure (III) with the residue R2 being an alkenyl group as defined above to those residues R2 being a linear or branched alkyl group having 6 to 15 carbon atoms is in the range of from In some embodiments, the ratio of fraction a) to fraction b) is in the range of from 10:1 to 1:10, preferably 1:2.3 to 1:9.

In some embodiments, the use of polyalkylsiloxanes as a mold release agent in a metal casting process concerns polyalkylsiloxanes as defined above, wherein the residue $R^1$ of each repeating unit according to general structure (II) is a methyl group; and the polyalkylsiloxane has a kinematic viscosity of 100 to 20000 mPa·s at 25° C., preferably of 100 to 7000 mPa·s at 25° C.

Furthermore, the polyalkylsiloxanes for use according to the present invention are preferably an oil.

The term "about", as used herein in relation to numerical values, means plus or minus 10% of the numerical value it refers to. Consequently, "about 50%" means in the range of 45% to 55%.

The term "essentially consisting of" according to the present invention means that something consists to at least 90%, preferably at least 95%, more preferably at least 99%, still more preferably at least 99.5, and most preferably at least 99.9% of the specified compound or composition. In case the term refers to the metal oxide layer the percentage is understood as weight % (w/w %). If a fluid phase or atmosphere is characterized, the percentage specification refers to volume percent (vol.-%).

By "consisting of" is meant including, and limited to, whatever follows the phrase "consisting of". Thus, the phrase "consisting of" indicates that the listed elements are required or mandatory, and that no other elements may be present.

By "comprising" it is meant including, but not limited to, whatever follows the word "comprising". Thus, use of the term "comprising" indicates that the listed elements are required or mandatory, but that other elements are optional and may or may not be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. All documents cited herein, are hereby incorporated by reference in their entirety.

EXAMPLES

Example 1

To a mixture of polymethylhydrosiloxane with the average formula $(CH_3)_3SiO(CH_3HSiO)_{25}Si(CH_3)_3$ (80 g, 1.205 mol free Si—H) and 1-dodecene (15.41 g, 0.092 mol) was added 4 ppm of a $H_2PtCl_6$ solution in isopropanol (0.145 mL, 17.1 mg/mL). The mixture was heated to 80° C. resulting in an exotherm heating the mixture to 140° C. 1-dodecene (138.7 g, 0.82 mol) was added at such a rate to keep the temperature 140-150° C. Subsequently, limonene (31.2 g, 0.23 mol) was added dropwise. After complete addition the mixture was heated at 150° C. for 1.5 hours. FTIR analysis showed <5% SiH. The viscosity of the product was 1500 mPa·s.

A 10 μm layer of the prepared silicon oil was applied on a steel plate followed by heating of the plate for 2 minutes at temperatures between 160 and 230° C. under aerobic conditions. Film formation was observed for the new low curing silicon oil and compared to state of the art silicon oils. Formation of a polymeric film on the metal surface was observed at temperatures of 170° C. and higher for the silicon oil of the invention. All other tested silicon oils (prior art silicon oils) showed film formation at temperatures of 225° C. and higher.

Mixtures of the silicon oil with light petroleum distillates in weight ratios of 10:1 to 1:3 afforded very low viscous oils with identical curing temperatures compared to the pure oil. These low viscous oils allow application of pure oils on the die by state of the art oil spraying equipment used in the pressure die casting industry.

Thermogravimetric analysis of the silicon oils showed a decomposition temperature of the low curing silicon oil which was identical or slightly better compared to regular silicon oil. The material was fully decomposed above 520° C.

What is claimed is:

1. A mixture of polyalkylsiloxanes obtained through a hydrosilylation reaction wherein a mixture of ethylenically unsaturated olefins consisting of:
   a) 10-30 mol % of one or more polyene(s) having one terminal double bond, which is either monosubstituted or geminal disubstituted, and one or more tri- or tetrasubstituted double bond(s); and
   b) 70-90 mol % of monounsaturated olefins with 6 to 15 carbon atoms;
   is reacted with an amount of one or more polyalkylhydrosiloxanes in the presence of a hydrosilylation catalyst while each polyalkylhydrosiloxane comprises a repeating unit according to the general structure (I):

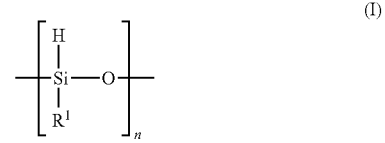

with n indicating the number of repeating units being in a range of from 10 to 10,000;
   with the residue $R^1$ being selected from linear or branched alkyl groups with less than 6 carbon atoms.

2. The mixture of polyalkylsiloxanes according to claim 1, wherein said terminal double bond and said one or more tri- or tetrasubstituted double bond(s) are non-conjugated.

3. The mixture of polyalkylsiloxanes according to claim 1, wherein said polyene(s) comprise terpenes.

4. The mixture of polyalkylsiloxanes according to claim 3, wherein said terpenes comprise (R)-limonene, (S)-limonene or a mixture thereof.

5. The mixture of polyalkylsiloxanes according to claim 1, wherein the amount of polyalkylhydrosiloxanes equals at least 60% of a stoichiometric amount and not more than the stoichiometric amount.

6. The mixture of polyalkylsiloxanes according to claim 1, wherein the polyalkylhydrosiloxanes are at least partially selected from polymethylhydrosiloxanes.

7. The mixture of polyalkylsiloxanes according to claim 1, wherein at least 80 mol % of the repeating units according to the general structure (I) have a residue $R^1$ being a methyl group.

8. The mixture of polyalkylsiloxanes according to claim 1, wherein at least 80 mol % of the monounsaturated olefins with 6 to 15 carbon atoms are selected from α-olefins.

9. The mixture of polyalkylsiloxanes according to claim 1, wherein the hydrosilylation catalyst is a platinum catalyst.

10. The mixture of polyalkylsiloxanes according to claim 1, obtained in a hydrosilylation reaction run at a temperature in a range of from 80 to 170° C. for a time sufficient to yield a mixture of polyalkylsiloxanes that contains not more than 10 mol % Si—H bonds.

11. The mixture of polyalkylsiloxanes according to claim 1, wherein an inert liquid vehicle that acts as a solvent for the one or more polyalkylhydrosiloxanes and/or the mixture of ethylenically unsaturated olefins is present in an amount of less than 20 wt.-%; and/or the mixture of polyalkylsiloxanes is an oil.

12. A water-based die casting release agent composition comprising water and:
  a) 1-50 wt.-% of the mixture of polyalkylsiloxanes according to claim 1,
  b) 1-15 wt.-% of a non-ionic surfactant having a HLB value of at least 8, and
  c) 0-30 wt.-% of waxes, mineral oils, natural oils and/or synthetic oils.

13. The water-based die casting release agent composition according to claim 12, wherein:
  i) the non-ionic surfactant is a mixture of polysorbate 85 and ethoxylated tridecyl alcohol;
  ii) the water-based composition is an oil-in-water emulsion; and/or
  iii) the waxes are polyethylenes and/or polypropylenes which are insoluble in water, are malleable at 20° C. and melt above 45° C.

14. A polyalkylsiloxane comprising repeating units according to general structure (II):

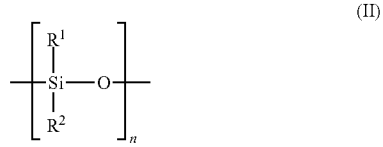

wherein n indicates the number of repeating units comprised in the polyalkylsiloxane,
wherein n is an integer of 10 to 10,000 and residue $R^1$ is selected from the group consisting of linear or branched alkyl groups with less than 6 carbon atoms,
wherein
  a) in 10-30% of the repeating units, $R^2$ is selected from the group consisting of linear or branched or cyclic alkenyl groups, obtained by the addition of a Si—H bond across the terminal double bond of a polyene having one terminal double bond, which is either mono- or geminal disubstituted, and one or more tri- or tetrasubstituted double bond(s), in a hydrosilylation reaction;
  b) in 70-90% of the repeating units, $R^2$ is selected from the group consisting of linear or branched alkyl groups with 6 to 15 carbon atoms; and
  c) in 0-10% of the repeating units, $R^2$ is H.

15. The polyalkylsiloxane according to claim 14, wherein the polyalkylsiloxane has a kinematic viscosity of 100 to 20000 mPa·s at 25° C.

16. The polyalkylsiloxane according to claim 14, wherein
  i) in the repeating units b), $R^2$ is selected from the group consisting of linear or branched alkyl groups with 6 to 14 carbon atoms;
  ii) the repeating units a) have a ratio to the repeating units b) in a range of from 1:10 to 1:1;
  iii) the polyalkylsiloxane is an oil; and/or
  iv) residue $R^1$ of each repeating unit according to general structure (II) is a methyl group.

17. A water-based die casting release agent composition comprising water and:
  a) 1-50 wt.-% of the polyalkylsiloxane according to claim 14,
  b) 1-15 wt.-% of a non-ionic surfactant having a HLB value of at least 8, and
  c) 0-30 wt.-% of waxes, mineral oils, natural oils and/or synthetic oils.

18. A mold release agent comprising polyalkylsiloxanes, for use in a metal casting process, wherein the polyalkylsiloxanes are:
  i) the polyalkylsiloxanes according to claim 14; and/or
  ii) polyalkylsiloxanes comprising a repeating unit according to the following general structure (II):

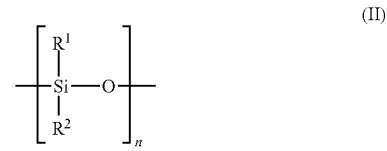

wherein n indicates the number of repeating units being in a range of from 5 to 10,000;
wherein for each repeating unit the residue $R^1$ is independently selected from linear alkyl groups with less than 6 carbon atoms; and
wherein for each repeating unit the residue $R^2$ is independently selected from (a) hydrogen or (b) linear or branched alkyl groups having 6 to 15 carbon atoms or (c) a linear or branched or cyclic alkenyl group, obtained by the addition of a Si—H bond across the terminal double bond of a polyene having one terminal double bond, which is either monosubstituted or geminal disubstituted, and one or more tri- or tetrasubstituted double bond(s), in a hydrosilylation reaction, while the fraction of repeating units with a residue $R^2$ being hydrogen is less than 0.1, being an alkenyl residue, is at least 0.10 and not greater than 0.30, and being a linear or branched alkyl group having 6 to 15 carbon atoms is at least 0.7 and not greater than 0.9.

19. A method of lubricating a die for use in a die casting process comprising:
  1) applying a die casting release agent comprising the mixture of polyalkylsiloxanes according to claim 1 to a die;
  2) curing the die casting release agent on the die at temperatures in a range of at least 170° C. and up to about 190° C. to form a solid film.

20. The polyalkylsiloxane according to claim 15, wherein the polyalkylsiloxane has a kinematic viscosity of 1500 to 20000 mPa·s at 25° C.

* * * * *